No. 855,338. PATENTED MAY 28, 1907.
M. C. RAYMOND.
COMBINATION TOOL.
APPLICATION FILED MAR. 4, 1907.
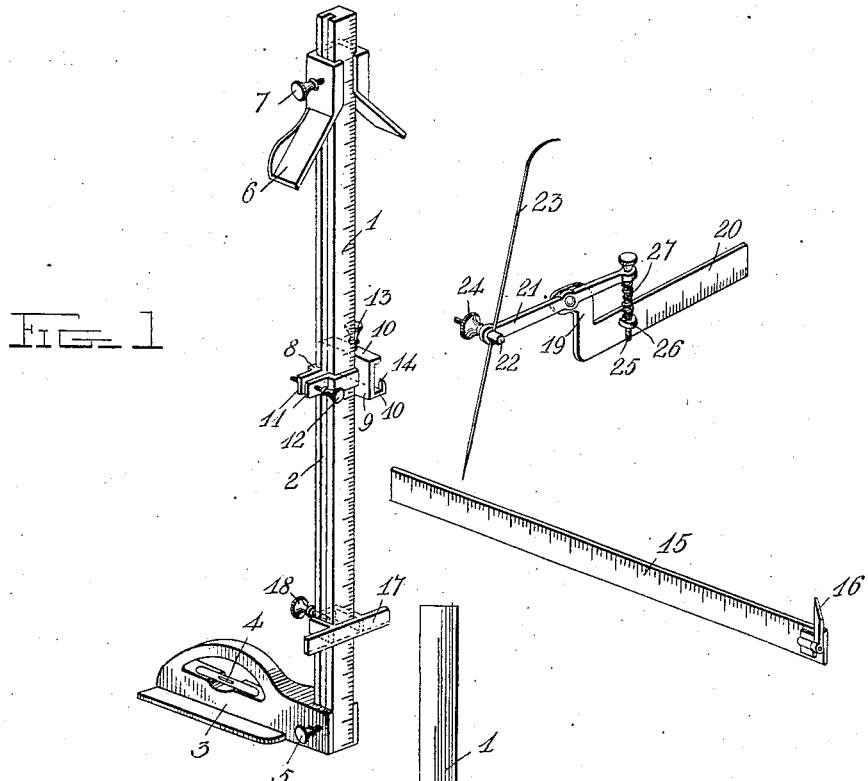
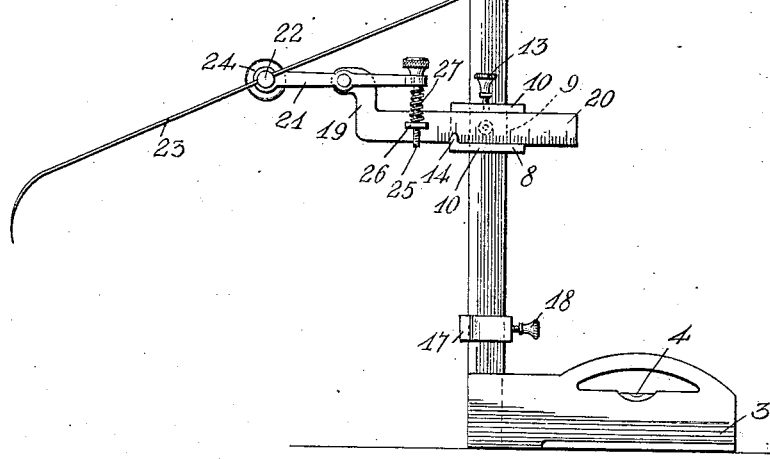
Witnesses
C. H. Griesbauer
Inventor
Marshall C. Raymond
by H. B. Willson & Co.
Attorneys

UNITED STATES PATENT OFFICE.

MARSHALL C. RAYMOND, OF RUTLAND, VERMONT.

COMBINATION-TOOL.

No. 855,338.     Specification of Letters Patent.     Patented May 28, 1907.

Application filed March 4, 1907. Serial No. 360,518.

*To all whom it may concern:*

Be it known that I, MARSHALL C. RAYMOND, a citizen of the United States, residing at Rutland, in the county of Rutland and State of Vermont, have invented certain new and useful Improvements in Combination-Tools; and I do declare the following to be a full, clear, and exact description of the invention, such as will enable others skilled in in art to which it appertains to make and use the same.

This invention relates to combination tools.

The object is to provide a tool, which shall combine in a compact, easily operated and thoroughly practical manner, means for key-seating and center-lining shafts, a universal square, and a depth and surface gage.

With the above and other objects in view, which appear as the nature of the invention is better understood, the same consists in the novel construction and arrangement of parts of a combination tool as will be hereinafter fully described and claimed.

In the accompanying drawings forming a part of this specification, and in which like characters of reference indicate corresponding parts, Figure 1 is a view in perspective of a tool showing all of the various parts, certain of them being detached; and Fig. 2 is a view in side elevation, showing the parts of the tool assembled for center-lining the shafts.

Referring to the drawings, 1 designates the graduated shank or stock of the tool which is provided, as usual, in one side or edge, with a guide groove 2. Combined with the shank for sliding movement thereon is a head or arm 3 with which is assembled a spirit level 4. This head straddles the stock and is disposed at right angles thereto, whereby to form a try-square, and is guided in its adjustments and held fixed at any desired point on the stock by a thumb or set screw 5 that works in the groove 2.

In order to constitute the tool, a universal square, there is combined with the stock a V-shaped head 6, that is used in centering shafts and other cylindrical bodies. This head, as shown in Fig. 1, straddles the stock and carries a set screw 7 that enters the groove 2 and thus clamps the head at any desired adjustment. As usual, the arms of the head are wider than the stock to allow them to bear against the object being centered.

As above stated, among other objects had in view, is to adapt the tool for use in key-seating and center-lining shafts, and for use as a depth and surface gage. The first object is secured by the provision of a sliding clamp 8 that consists of a plate 9 carrying two ledges or flanges 10, and two arms 11 that straddle the stock and are secured at any desired adjustment thereon by a set or locking screw 12. One of the flanges, in this instance the upper one, carries a set screw 13 that is provided for the purpose of clamping the attachment to be employed and the lower one carries a hand or pointer 14.

When a shaft is to be key-seated or center-lined, a graduated scale 15 is assembled with the clamp and is held in place by the set screw 13, and by observing the relation occupied by the hand or pointer relatively to the graduations on the scale 15, accurate measurements will be secured. The scale carries at one end a scriber 16 by which the shaft or other object is marked or scored.

To protect the stock from injury when the shaft is to be scribed, there is a guard 17 provided which is slidably mounted upon the stock and is held against movement by a set screw 18. When using the tool either for key-seating or center-lining a shaft, the scale 15 is adjusted to bring the scriber at the proper point, and the tool is then moved along the shaft with the guard bearing against it, thus securing the object sought. The second object above defined, namely the adaptation of the tool for use as a depth or surface gage is secured by the provision of a novel form of scriber holder to be combined with the clamp 8. This holder consists of an approximately L-shaped arm 19, the inner end of which carries a head 20 to engage the clamp 8 and be held therein by a screw 13. Pivotally connected intermediate its ends to the outer end of the arm is a lever 21 that carries at its outer end a screw 22 through which projects the scriber or needle 23 of the surface gage and, as usual, has one end pointed and straight and the other end pointed and curved. The screw 22 carries a nut 24 by which the scriber may be clamped in its adjusted position.

In order to secure fine adjustments of the scriber after the nut 24 is tightened, an adjusting screw 25 is provided that passes loosely through the inner end of the lever 21 and is threaded into a boss or offset 26 on the arm 19. Upon the screw 25 is placed a coiled spring 27 that bears respectively against the lever and boss, and thus operates to hold the lever at the desired adjustment.

As the manner in which the tool is used, when in effecting surface or depth gaging is well understood, detailed description thereof is omitted.

It will be seen from the foregoing description that by the manner of arranging and assembling the parts of the tool, that by slight changes and adjustments, all of the functions designed may be secured, and further that accurate work will result.

Having thus described my invention, what I claim as new is,—

1. A combination tool comprising a stock, a head adjustably mounted thereon and carrying a spirit level, a centering head adjustably mounted upon the stock, a guard also adjustably mounted upon the stock, a clamp adjustably mounted upon the stock, a scriber holder arranged to engage the clamp, said holder comprising an arm, an adjustable spring-pressed lever fulcrumed thereon, and a scriber clamp carried by the lever.

2. A combination tool comprising a stock, a head thereon, a clamp adjustably mounted upon the stock, and a scriber holder arranged to engage the clamp, said holder comprising an arm, a pivoted spring-pressed lever carried by the arm, and a scriber clamp and bolt carried by the lever.

3. A combination tool comprising a stock, a head adjustably mounted thereon, a guard also adjustably mounted upon the stock, and a clamp similarly mounted upon the stock and embodying a plate provided with ledges, a clamping screw carried by one ledge, a hand or pointer carried by the other ledge, a graduated scale arranged to engage the clamp, and a scriber carried by one end of the scale.

In testimony whereof I have hereunto set my hand in presence of two subscribing witnesses.

MARSHALL C. RAYMOND.

Witnesses:
H. H. HUNTER,
W. J. BUSNELL.